No. 855,075. PATENTED MAY 28, 1907.
B. A. THOMAS.
LAND ROLLER.
APPLICATION FILED JAN. 29, 1906.
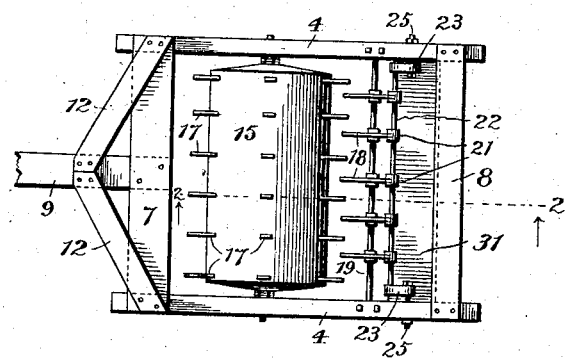
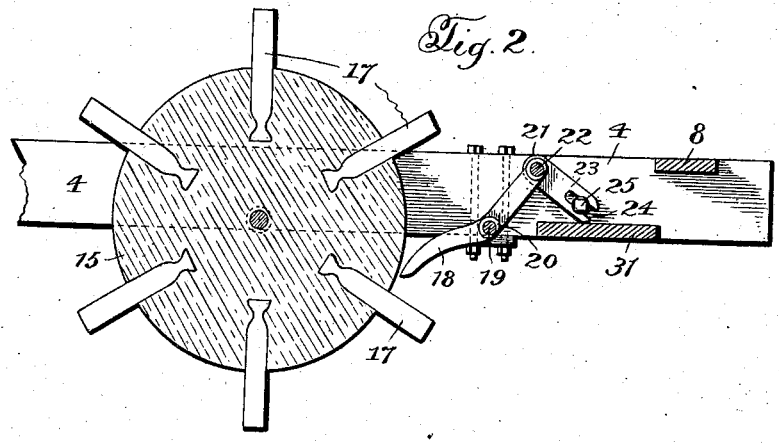
Witnesses
Jas Es Hutchinson
W. W. Hite
Inventor
Benjamin A. Thomas,
By Royal E. Burnham, Attorney

UNITED STATES PATENT OFFICE.

BENJAMIN A. THOMAS, OF PADUCAH, KENTUCKY.

LAND-ROLLER.

No. 855,075.  Specification of Letters Patent.  Patented May 28, 1907.

Application filed January 29, 1906. Serial No. 298,418.

*To all whom it may concern:*

Be it known that I, BENJAMIN A. THOMAS, a citizen of the United States, residing at Paducah, in the county of McCracken and State of Kentucky, have invented certain new and useful Improvements in Land-Rollers, of which the following is a specification, reference being had therein to the accompanying drawing.

This invention provides simple and effective means for keeping the roller clear of trash, earth, and the like, which may accumulate thereon.

Novel details of the invention will be apparent from the detail description hereinafter, when read in connection with the accompanying drawings, forming part hereof, and wherein a preferable embodiment of the invention is disclosed for purposes of illustration.

Like reference-characters refer to corresponding parts in the several views of the drawings, of which—

Figure 1 is a plan view; and Fig. 2 is a longitudinal sectional view on the line 2—2, Fig. 1.

Having more particular reference to the drawings, it will be seen that the roller-frame comprises longitudinal members 4, fastened to which are transverse members 7, 8, and 31. A draft-tongue 9 is attached to member 7 and is braced by oblique members 12 connected to said member and tongue.

Journaled in members 4 is a roller 15, which may or may not be provided with teeth 17, as desired. For the purpose of keeping the roller, and also the teeth when they are used, clear of accumulations of trash, earth, and the like, clearer-fingers 18 are disposed in proximity to the roller. The clearer-fingers are supported by a rod 19 which passes through journals 20 in the fingers and which is supported by members 4, the construction being such as to permit the fingers to turn on rod 19. The after ends of clearer-fingers 18 are formed with journals 21, through which passes an adjusting-rod 22. Rod 22 is pivotally connected at its ends to arms 23, which are disposed adjacent to members 4, and in the free ends of which are provided longitudinal slots 24. Adjustable bolts 25 pass through members 4 and seat in slots 24.

When it is desired to alter the distance of the free ends of the clearer-fingers 18 from the roller, bolts 25 are loosened, arms 23 are moved in the desired direction, such movement being permitted by slots 24, and the bolts again tightened, by this operation the adjustment being made in an obvious manner.

Having thus described the invention, what is claimed as new, and is desired to be secured by Letters Patent, is—

1. In combination with a land-roller, a finger-shaft, clearer-fingers thereon, and an adjusting-shaft connected with said fingers.

2. In combination with a land-roller, a finger-shaft, clearer-fingers thereon, an adjusting-shaft connected with said fingers, and means whereby said adjusting-shaft is adjustably held in place.

3. In combination with a land-roller, a finger-shaft, clearer-fingers thereon, an adjusting-shaft connected with said fingers, and an arm connected with said adjusting-shaft whereby the latter is adjustably held in place.

4. In combination with a land-roller, a finger-shaft, clearer-fingers thereon, an adjusting-shaft connected with said fingers, a slotted arm connected with said adjusting-shaft, and a bolt passed through the slot in said arm whereby the latter is adjustably secured.

5. In combination with a land-roller, a finger-shaft, clearer-fingers thereon, an adjusting-shaft connected with said fingers, an arm connected with said adjusting-shaft, and a bolt engaging said arm whereby the latter is adjustably secured.

6. In combination with longitudinal frame members, a roller journaled therein, a finger-shaft attached to said frame-members, clearer-fingers on said finger-shaft, an adjusting-shaft connected with said fingers, an arm connected with said adjusting-shaft, and a bolt attached to one of said frame-members and engaging said arm whereby the latter is adjustably secured.

7. In combination with a land-roller, clearer-fingers, a slotted arm operatively connected with said fingers whereby the latter are adjusted, and a bolt passed through the slot in said arm whereby the arm is adjustably secured.

In testimony whereof I affix my signature in presence of two witnesses.

BENJAMIN $\overset{\text{his}}{\times}$ A. THOMAS.
mark

Witnesses:
JNO. W. BEBOUT,
WILLIE A. SCHMIDT.